(12) United States Patent
Farner et al.

(10) Patent No.: US 11,155,364 B2
(45) Date of Patent: Oct. 26, 2021

(54) OPTICAL SYSTEMS AND METHODS FOR AIRCRAFT FLIGHT CONTROL RIGGING

(71) Applicant: The Boeing Company, Chicago, IL (US)

(72) Inventors: Scott Charles Farner, North Charleston, SC (US); Joseph Edward Dale Sharp, Heath, OH (US); Randall Wade Dickson, North Charleston, SC (US)

(73) Assignee: The Boeing Company, Chicago, IL (US)

( * ) Notice: Subject to any disclaimer, the term of this patent is extended or adjusted under 35 U.S.C. 154(b) by 751 days.

(21) Appl. No.: 15/884,734

(22) Filed: Jan. 31, 2018

(65) Prior Publication Data

US 2019/0233136 A1    Aug. 1, 2019

(51) Int. Cl.
   *B64F 5/10*         (2017.01)
   *B64C 9/02*         (2006.01)
   (Continued)

(52) U.S. Cl.
   CPC .............. *B64F 5/10* (2017.01); *B64C 9/02* (2013.01); *B64F 5/60* (2017.01); *G01S 17/06* (2013.01);
   (Continued)

(58) Field of Classification Search
   CPC ..... B64F 5/10; B64F 5/60; B64C 9/02; B64C 9/30; B64C 5/10; B64C 9/14; B64C 2009/005; G01S 17/06
   (Continued)

(56) References Cited

U.S. PATENT DOCUMENTS

| 7,978,322 B2 | 7/2011 | Marsh et al. |
| 8,199,194 B2 | 6/2012 | Troy et al. |
| 9,216,829 B2 | 12/2015 | Stahl et al. |
| 9,551,790 B2 | 1/2017 | Marsh et al. |
| 2010/0210972 A1 | 8/2010 | Marsh et al. |

FOREIGN PATENT DOCUMENTS

| EP | 2 682 341 A1 | 8/2014 |
| EP | 2 818 835 A2 | 12/2014 |

(Continued)

OTHER PUBLICATIONS

European Search Report prepared by the European Patent Office in Application No. 19 15 1642.6 dated Dec. 4, 2019.

(Continued)

*Primary Examiner* — Daniel L Murphy
(74) *Attorney, Agent, or Firm* — McDonnell Boehnen Hulbert & Berghoff LLP

(57) ABSTRACT

Systems and methods for aircraft flight control rigging are described. An example system includes a first set of laser rangefinders to measure, for each laser rangefinder of the first set, a distance from the laser rangefinder to a respective target location on a fixed surface of an aircraft, and a second set of laser rangefinders to measure, for each laser rangefinder of the second set, a distance to a respective target location on a control surface of the aircraft. The example system also includes a processor to (i) receive signals indicative of the distance measured by each rangefinder and (ii) generate a first plot line graphic of the measured distances of each of the rangefinders of the first set to its respective target location and a second plot line graphic of the measured distances of each of the laser rangefinders of the second set to its respective target location.

20 Claims, 7 Drawing Sheets

(51) Int. Cl.
  *B64F 5/60*  (2017.01)
  *G01S 17/06*  (2006.01)
  *B64C 9/30*  (2006.01)
  *B64C 9/14*  (2006.01)
  *B64C 5/10*  (2006.01)
  *B64C 9/00*  (2006.01)

(52) U.S. Cl.
  CPC .................................... *B64C 5/10* (2013.01); *B64C 9/14* (2013.01); *B64C 9/30* (2013.01); *B64C 2009/005* (2013.01)

(58) Field of Classification Search
  USPC ........................................................ 356/4.01
  See application file for complete search history.

(56) References Cited

FOREIGN PATENT DOCUMENTS

| EP | 2 878 921 | 6/2015 | | |
|---|---|---|---|---|
| EP | 2 944 918 | 11/2015 | | |
| EP | 3364148 A1 | * | 8/2018 | ........... G01C 15/004 |

OTHER PUBLICATIONS

Communication pursuant to Article 94(3) EPC issued by the European Patent Office in Application No. 19 15 1642.6 dated Jun. 15, 2021.

* cited by examiner

Simultaneously triggering each laser rangefinder of the first and second sets to take a measurement of its distance to its respective target location  ⟵ 312

FIG. 7

If the determination is that the first and second plot line graphics are not aligned with one another, adjusting a position of the control surface  ⟵ 314

FIG. 8

Iteratively performing the functions of blocks 302-314 until the first plot line graphic and the second plot line graphic are aligned with one another  ⟵ 316

FIG. 9

Positioning each laser rangefinder of the first and second sets to point its laser beam to its respective target location  ⟵ 318

FIG. 10

OPTICAL SYSTEMS AND METHODS FOR AIRCRAFT FLIGHT CONTROL RIGGING

FIELD

The present disclosure relates generally to aircraft flight control rigging and, more particularly, to optical systems and methods for aircraft flight control rigging.

BACKGROUND

Aircraft flight control rigging involves the adjustment and travel of moveable flight control surfaces which are attached to aircraft surfaces, such as wings, vertical stabilizers, and horizontal stabilizers. The rigging process involves carefully aligning a moveable flight control surface of the aircraft (e.g., an aileron attached to a wing, an elevator attached to a horizontal stabilizer, or a rudder attached to a vertical stabilizer) with a fixed surface of the aircraft. This alignment provides a known reference position for the moveable flight control surface, and movement of the control surface can then be precisely controlled using the known reference position. The rigging process helps to ensure that the moveable flight control surfaces operate as intended so that the aircraft performs efficiently and safely. One conventional approach for aircraft flight control rigging involves rigging personnel using mechanical jigs affixed to both a control surface and a fixed reference. Rigging personnel attach these mechanical jigs to the control surface and the fixed reference, and then visually align the control surface and fixed reference using precisely machined graduations on the mechanical jigs.

The conventional approaches for aircraft flight control rigging, however, have numerous drawbacks. For instance, conventional approaches rely on the rigging personnel's view of the mechanical jigs and their determination that the surfaces are properly aligned. However, the rigging personnel's view of the mechanical jigs and their determination that the surfaces are properly aligned are both subjective and subject to changes based on environmental conditions (e.g., lighting). Further, rigging personnel typically physically attach these mechanical jigs to the aircraft using machine lifts, which exposes rigging personnel to potential hazardous falls. Still further, rigging personnel are typically positioned close to the moving control surface to allow them to clearly view the mechanical jigs. This close proximity exposes the rigging personnel to potentially hazardous moving surfaces during the rigging process. Yet still further, during the rigging process, the fixed surface (e.g., the wing) may be subject to jitter (e.g., vibrations or other movement), and the accuracy of conventional approaches for aircraft flight control rigging may be affected by such jitter of the fixed surface.

In view of the foregoing, there is a need for improved systems and methods for aircraft flight control rigging. Particularly, there is a need for systems and methods for aircraft flight control rigging that reduce or eliminate reliance on a visual determination that the moving control surface and fixed surface are aligned. There is also a need for systems and methods for aircraft flight control rigging that prevent rigging personnel from being exposed to potentially hazardous falls and/or potentially hazardous moving surfaces. There is also a need for systems and methods for aircraft flight control rigging that reduce or eliminate the effect of jitter of the fixed surface.

SUMMARY

In one example, an optical system for aircraft flight control rigging is described. The optical system includes a first set of laser rangefinders to measure, for each laser rangefinder of the first set, a distance from the laser rangefinder to a respective target location on a fixed surface of an aircraft. The optical system also includes a second set of laser rangefinders to measure, for each laser rangefinder of the second set, a distance to a respective target location on a control surface of the aircraft. The optical system also includes a processor in communication with each laser rangefinder of the first and second sets to (i) receive signals indicative of the distance measured by each laser rangefinder and (ii) generate a first plot line graphic of the measured distances of each of the laser rangefinders of the first set to its respective target location and a second plot line graphic of the measured distances of each of the laser rangefinders of the second set to its respective target location.

Within examples, the processor simultaneously triggers each of the laser rangefinders of the first and second sets to take a measurement of its distance to its respective target location.

Within examples, the optical system further comprises a mounting station to mount each laser rangefinder of the first and second sets thereto.

Within examples, the optical system further comprises, for each laser rangefinder of the first and second sets, a mounting device attached to the laser rangefinder, wherein the mounting device is configured to position the laser rangefinder to point a laser beam to its respective target location.

Within examples, the mounting station comprises an adjustable body that allows for adjusting distances between each of the laser rangefinders of the first and second sets.

Within examples, the control surface is selected from the group consisting of a flap, a rudder, a slat, an elevator, an anti-balance tab, a balance tab, an aileron, a flaperon, and a spoileron.

Within examples, the fixed surface comprises a stationary surface on a wing or stabilizer of the aircraft.

Within examples, the target locations on the fixed surface of the aircraft and the target locations on the control surface of the aircraft are predefined target locations based on manufacturing specifications of the aircraft.

Within examples, the predefined target locations based on manufacturing specifications of the aircraft are selected such that the target locations are arranged in a path through which a straight line is drawn when the control surface is arranged in a known reference position.

Within examples, the processor generates a perpendicular bisector of the first plot line graphic to determine a distance between the first plot line graphic and a line extending through the second plot line graphic, so as to determine whether the target locations on the fixed surface and the target locations on the control surface are aligned within a predefined tolerance.

Within examples, the processor calculates a slope of the first plot line graphic and a slope of the second plot line graphic and determines whether the calculated slopes are within a threshold amount of one another, so as to determine whether the target locations on the fixed surface and the target locations on the control surface are aligned within a predefined tolerance.

In another example, an optical system for aircraft flight control rigging is described. The optical system includes a first set of laser rangefinders to measure, for each laser rangefinder of the first set, a distance from the laser rangefinder to a respective target location on a fixed surface of an aircraft. The optical system also includes a second set of laser rangefinders to measure, for each laser rangefinder of the second set, a distance to a respective target location on a control surface of the aircraft. The optical system also includes a mounting station to mount each laser rangefinder of the first and second sets thereto. The optical system also includes a processor in communication with each laser rangefinder of the first and second sets to (i) simultaneously trigger each of the laser rangefinders of the first and second sets to take a measurement of its distance to its respective target location, (ii) receive signals indicative of the distance measured by each laser rangefinder, and (iii) generate a first plot line graphic of the measured distances of each of the laser rangefinders of the first set to its respective target location and a second plot line graphic of the measured distances of each of the laser rangefinders of the second set to its respective target location.

Within examples, the mounting station comprises an adjustable body that allows for adjusting distances between each of the laser rangefinders of the first and second sets.

Various examples of the system(s) described herein may include any of the components, features, and functionalities of any of the other examples of the system(s) described herein in any combination.

In another example, a method for rigging the flight control of an aircraft is described. The method includes a first set of laser rangefinders measuring, for each laser rangefinder of the first set, a distance from the laser rangefinder to a respective target location on a fixed surface of the aircraft. The method also includes a second set of laser rangefinders measuring, for each laser rangefinder of the second set, a distance to a respective target location on a control surface of the aircraft. The method also includes a processor in communication with each laser rangefinder of the first and second sets receiving signals indicative of the distance measured by each laser rangefinder of the first and second sets. The method also includes the processor generating a first plot line graphic of the measured distances of each laser rangefinder of the first set to its respective target location and a second plot line graphic of the measured distances of each laser rangefinder of the second set to its respective target location. The method also includes the processor determining whether the first plot line graphic and the second plot line graphic are aligned with one another.

Within examples, the method also includes simultaneously triggering each laser rangefinder of the first and second sets to take a measurement of its distance to its respective target location.

Within examples, the method also includes, if the determination is that the first and second plot line graphics are not aligned with one another, adjusting a position of the control surface.

Within examples, the method includes iteratively performing the steps of the method until the first plot line graphic and the second plot line graphic are aligned with one another.

Within examples, the method also includes positioning each laser rangefinder of the first and second sets to point its laser beam to its respective target location.

Within examples, determining whether the first plot line graphic and the second plot line graphic are aligned with one another comprises: (i) generating a perpendicular bisector of the first plot line graphic; and (ii) determining a distance between the first plot line graphic and a line extending through the second plot line graphic, so as to determine whether the target locations on the fixed surface and the target locations on the control surface are aligned within a predefined tolerance.

Within examples, determining whether the first plot line graphic and the second plot line graphic are aligned with one another comprises: (i) calculating a slope of the first plot line graphic and a slope of the second plot line graphic; and (ii) determining whether the calculated slopes are within a threshold amount of one another, so as to determine whether the target locations on the fixed surface and the target locations on the control surface are aligned within a predefined tolerance.

Various examples of the method(s) described herein may include any of the components, features, and functionalities of any of the other examples of the method(s) described herein in any combination.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 7 shows a flowchart of an example method for use with the method in FIG. 6, according to an example implementation.

FIG. 8 shows a flowchart of another example method for use with the method in FIG. 6, according to an example implementation.

FIG. 9 shows a flowchart of another example method for use with the method in FIG. 6, according to an example implementation.

FIG. 10 shows a flowchart of another example method for use with the method in FIG. 6, according to an example implementation.

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

As mentioned above, current systems and methods for aircraft flight control rigging have a number of drawbacks. The methods and systems in accordance with the present disclosure beneficially provide improved methods and systems for aircraft flight control rigging. In one example, an optical system is described that includes a first set of laser rangefinders to measure, for each laser rangefinder of the first set, a distance from the laser rangefinder to a respective target location on a fixed surface of an aircraft, and a second set of laser rangefinders to measure, for each laser rangefinder of the second set, a distance to a respective target location on a control surface of the aircraft. The example system also includes a processor to (i) receive signals indicative of the distance measured by each rangefinder and (ii) generate a first plot line graphic of the measured distances of each of the rangefinders of the first set to its respective target location and a second plot line graphic of the measured distances of each of the laser rangefinders of the second set to its respective target location. Within examples, the optical system simultaneously triggers each of the laser rangefinders of the first and second sets to take a measurement of its distance to its respective target location. The disclosed optical system beneficially provides an improved system for aircraft flight control rigging that prevents rigging personnel from being exposed to potentially hazardous falls and/or potentially hazardous moving surfaces, and that reduce or eliminates the effect of jitter of the fixed surface.

Figure 1:
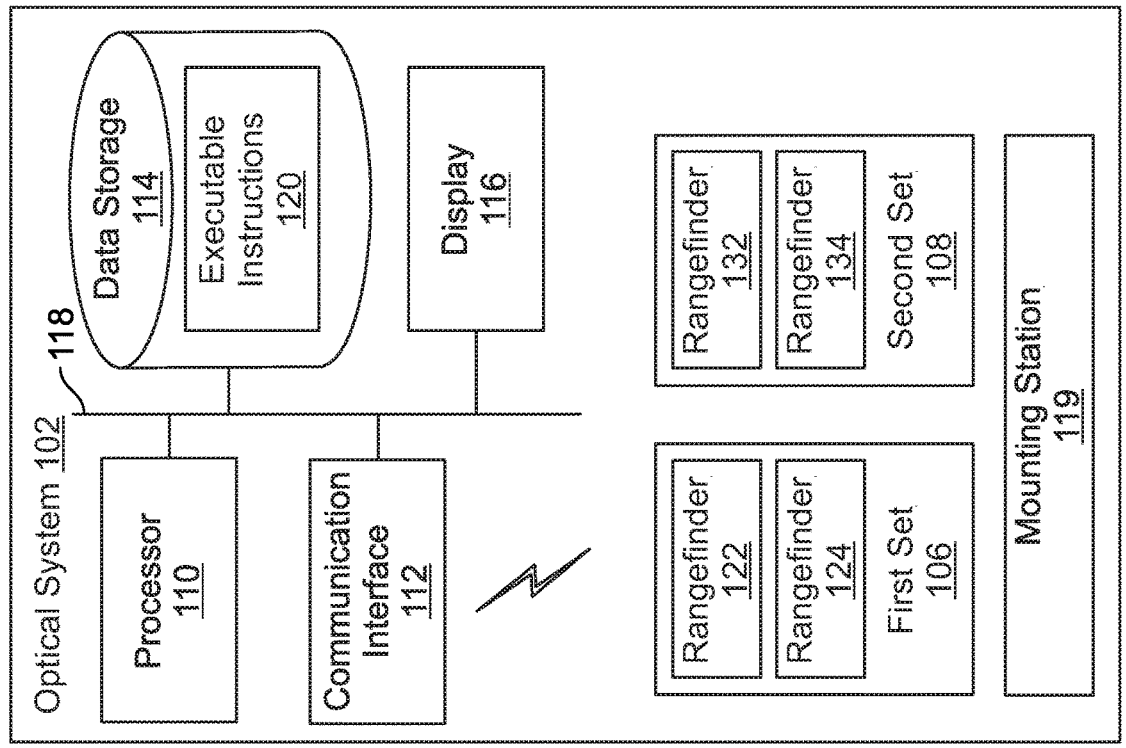
FIG. 1 is a block diagram of a system, according to an example implementation.
Figure 1:
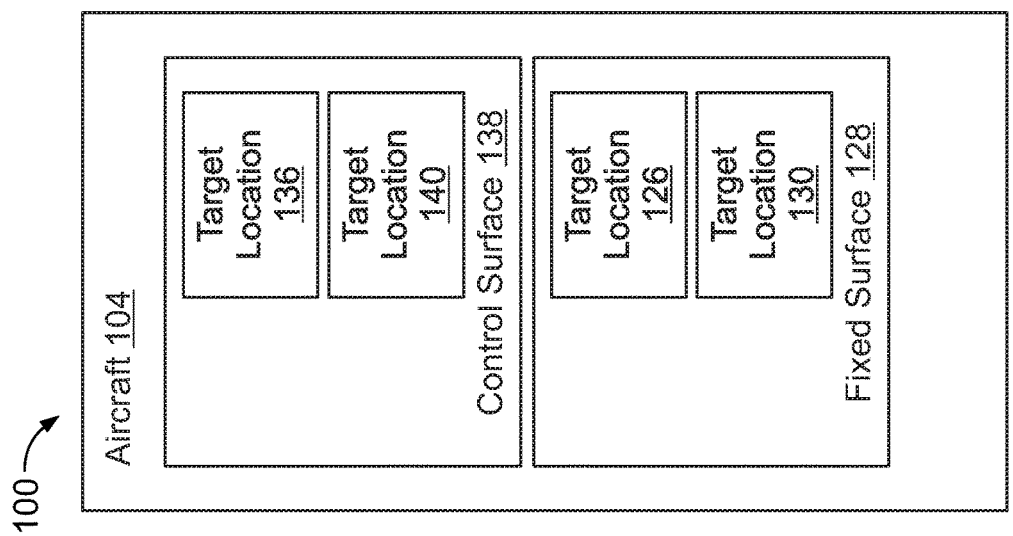

Referring now to FIG. 1, a block diagram of a system 100 is illustrated, according to an example implementation. The system 100 includes an optical system 102 and an aircraft 104. Optical system 102 includes a first set 106 of laser rangefinders, a second set 108 of laser rangefinders, and a processor 110. The optical system 102 also includes a communication interface 112, data storage 114, and a display 116 each connected to a communication bus 118. The optical system 102 may also include hardware to enable communication within the optical system 102 and between the optical system 102 and other devices (not shown). The hardware may include transmitters, receivers, and antennas, for example. Further, the optical system 102 includes a mounting station 119 to mount each laser rangefinder of the first and second sets 106, 108 thereto.

The processor 110 is in communication with each laser rangefinder of the first and second sets 106, 108 via the communication interface 112. The communication interface 112 may be a wireless interface and/or one or more wireline interfaces that allow for both short-range communication and long-range communication to one or more networks or to one or more remote devices. Such wireless interfaces may provide for communication under one or more wireless communication protocols, such as Very High Frequency (VHF) Data link (VDL), VDL Mode 2, Aircraft Communications Addressing and Reporting System (ACARS) digital communications over VHF radio and satellite communications (SATCOM), Bluetooth, WiFi (e.g., an Institute of Electrical and Electronic Engineers (IEEE) 802.11 protocol), Long-Term Evolution (LTE), cellular communications, near-field communication (NFC), and/or other wireless communication protocols. Such wireline interfaces may include Ethernet interface, a Universal Serial Bus (USB) interface, Telecommunications Industry Association (TIA) Standard 232, or similar interface to communicate via a wire, a twisted pair of wires, a coaxial cable, an optical link, a fiber-optic link, or other physical connection to a wireline network. Thus, the communication interface 112 may be configured to receive input data from one or more devices, and may also be configured to send output data to other devices.

The communication interface 112 may also include a user-input device, such as a keyboard or mouse, for example. In some examples, the communication interface 112 receives information input by a user, such as an input to simultaneously trigger the laser rangefinders of the first set 106 and the second set 108, for example.

The data storage 114 may include or take the form of memory, and may include one or more computer-readable storage media that can be read or accessed by the processor 110. The computer-readable storage media can include volatile and/or non-volatile storage components, such as optical, magnetic, organic or other memory or disc storage, which can be integrated in whole or in part with the processor 110. The data storage 114 is considered non-transitory computer readable media. In some embodiments, the data storage 114 is implemented using a single physical device (e.g., one optical, magnetic, organic or other memory or disc storage unit), while in other embodiments, the data storage 114 is implemented using two or more physical devices.

The data storage 114 thus is a non-transitory computer readable storage medium, and executable instructions 120 are stored thereon. The instructions 120 include computer executable code. When the instructions 120 are executed by the processor 110, the processor 110 is caused to perform functions described herein, including for instance generating a first plot line graphic of the measured distances of each of the laser rangefinders of the first set to its respective target location and a second plot line graphic of the measured distances of each of the laser rangefinders of the second set to its respective target location. Details of the example functions are described below.

Within examples, the processor 110 is a general-purpose processor(s) or a special purpose processor(s) (e.g., digital signal processors, application specific integrated circuits, etc.). The processor 110 may receive inputs from the communication interface 112, and process the inputs to generate outputs that are stored in the data storage 114 and output to the display 116. The processor 110 can be configured to execute the executable instructions 120 (e.g., computer-readable program instructions) that are stored in the data storage 114 and are executable to provide the functionality of the optical system 102 described herein.

The first set 106 of laser rangefinders is configured to measure, for each laser rangefinder of the first set, a distance from the laser rangefinder to a respective target location on a fixed surface of an aircraft. In the example of FIG. 1, first set 106 of laser rangefinders includes laser rangefinders 122 and 124. Laser rangefinder 122 is configured to measure a distance to target location 126 on a fixed surface 128 of aircraft 104, and laser rangefinder 124 is configured to measure a distance to target location 130 on the fixed surface 128.

The second set 108 of laser rangefinders is configured to measure, for each laser rangefinder of the second set, a distance to a respective target location on a control surface of the aircraft. In the example of FIG. 1, second set 108 of laser rangefinders includes laser rangefinders 132 and 134. Laser rangefinder 132 is configured to measure a distance to target location 136 on a control surface 138 of aircraft 104, and laser rangefinder 134 is configured to measure a distance to target location 140 on the control surface 138.

Figure 2:
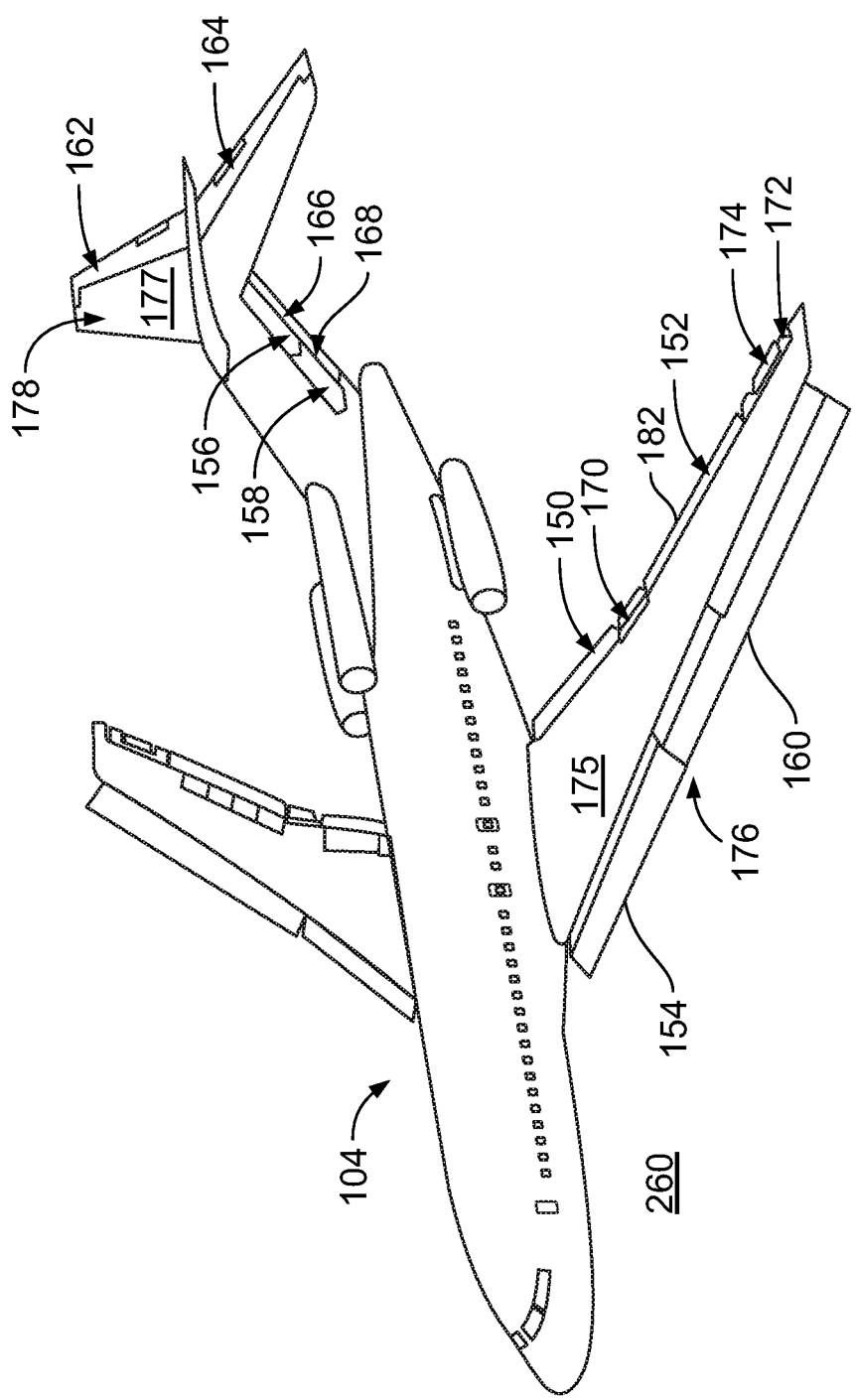
FIG. 2 illustrates a perspective view of an example aircraft with example control surfaces, according to an example implementation.

The control surface 138 may be any control surface on aircraft 104 for which aircraft flight control rigging is desired. FIG. 2 illustrates various example control surfaces of aircraft 104. Within examples, the control surface 138 is a flap, such as inboard flap 150, outboard flap 152, or leading edge flap 154. Within other examples, control surface 138 is a rudder, such as upper rudder 156 or lower rudder 158. Within other examples, control surface 138 is a slat, such as leading edge slat 160. Within other examples, control surface 138 is an elevator, such as elevator 162 or elevator 164. Within other examples, the control surface 138 is an anti-balance tab, such as anti-balance tab 166 or 168. Within other examples, the control surface 138 is an aileron, such as inboard aileron 170 or outboard aileron 172. Within other examples, control surface 138 is a balance tab, such as balance tab 174. Within other examples, control surface is a flaperon or a spoileron. Other control surfaces are possible as well.

Further, the fixed surface 128 may be any suitable fixed surface of the aircraft 104. Within examples, the fixed surface comprises a stationary surface on a wing or stabilizer of the aircraft 104, such as stationary surface 175 on wing 176 or stationary surface 177 on stabilizer 178 shown in FIG. 2. Within examples, the fixed surface 128 is located near the control surface 138 being rigged. For instance, the fixed surface 128 may be located within a threshold distance from the control surface 138 being rigged. Example threshold distances include distances between about 1-20 feet (e.g., about 1 foot, about 3 feet, about 5 feet, about 10 feet, about 15 feet, or about 20 feet); however, other threshold distances are possible as well.

Figure 3:
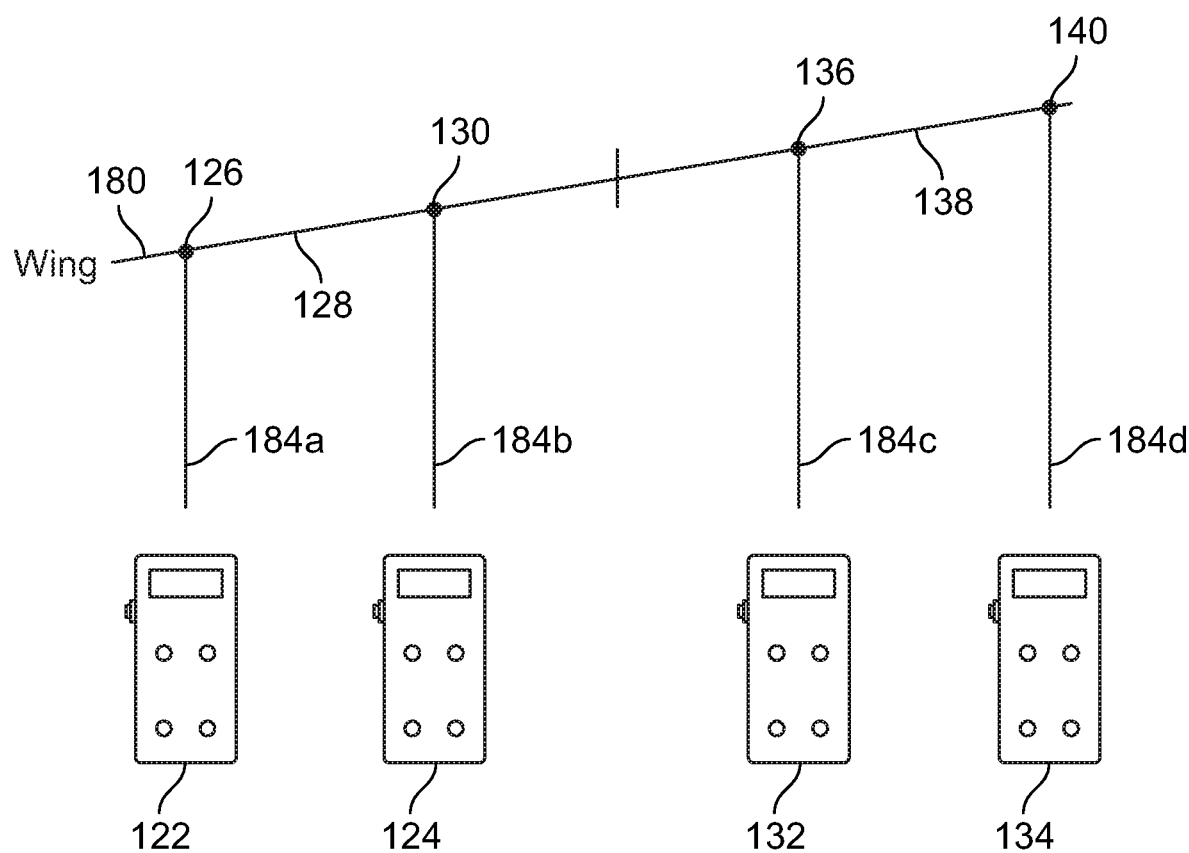
FIG. 3 illustrates example target locations on a fixed surface of the aircraft and example target locations on a control surface of the aircraft, according to an example implementation.

Within examples, the target locations 126, 130, 136, and 140 are predetermined locations selected such that the target locations are arranged in a path through which a straight line is drawn when the control surface 138 is arranged in a known reference position relative to fixed surface 128. For instance, FIG. 3 illustrates target locations 126, 130 of the fixed surface 128 and target locations 136, 140 of the control surface arranged in a path through which straight line 180 is drawn when the control surface 138 is arranged in the known reference position. These target locations 126, 130, 136, and 140 may be any suitable predetermined locations that allow for a straight or substantially straight line to be drawn therethrough when the control surface 138 is arranged in a known reference position relative to the fixed surface 128. As a particular example, target location 126 can be a predefined fastener on the wing 176 of the aircraft 104, and target location 130 can be a predefined point on the wing 176 that is a given longitudinal distance from that fastener and a given lateral distance from the trailing edge 182 (see FIG. 2). Further, target locations 136 and 140 can be predefined fasteners on control surface 138. It should be understood that these particular target locations are intended as examples only and any suitable target locations are possible. In practice, the selected target locations may depend on (i) what fixed surface and control surface are being aligned and (ii) the ability to draw a straight line or substantially straight line through the target locations.

Within examples, the target locations 126, 130 on the fixed surface 128 and the target locations 136, 140 on the control surface 138 are selected based on manufacturing specifications of the aircraft. The manufacturing specifications may define particular dimensions for the fixed surfaces and/or control surfaces, as well as particular points (e.g., fastener locations) on those fixed surfaces and control surfaces that can be used as predefined target locations. In practice, the flight-controls group can define the target locations to be used for the control surfaces based on these manufacturing specifications.

With reference to FIG. 3, laser rangefinders 122, 124 can measure a distance from the laser rangefinder to their respective target locations 126, 130 on fixed surface 128, and laser rangefinders 132, 134 can measure a distance from the laser rangefinder to their respective target locations 136, 140 on control surface 138. In order to measure the distance to the target location, each laser rangefinder is configured to point a respective laser beam 184a-184d to its respective target location. The laser beams 184a-184d can reflect off the respective target locations and the laser rangefinders 122, 124, 132, 134 can calculate the distance to the target location based on the amount of time it took from when the respective laser beam 184a-184d left the rangefinder until it returned. Each laser rangefinder 122, 124, 132, 134 may include a processor and memory to execute instructions in order to measure the distance to its target location. After measuring the distances to their respective target locations, the laser rangefinders 122, 124, 132, 134 can then send signals indicative of the distance measured to processor 110.

Figure 4A:
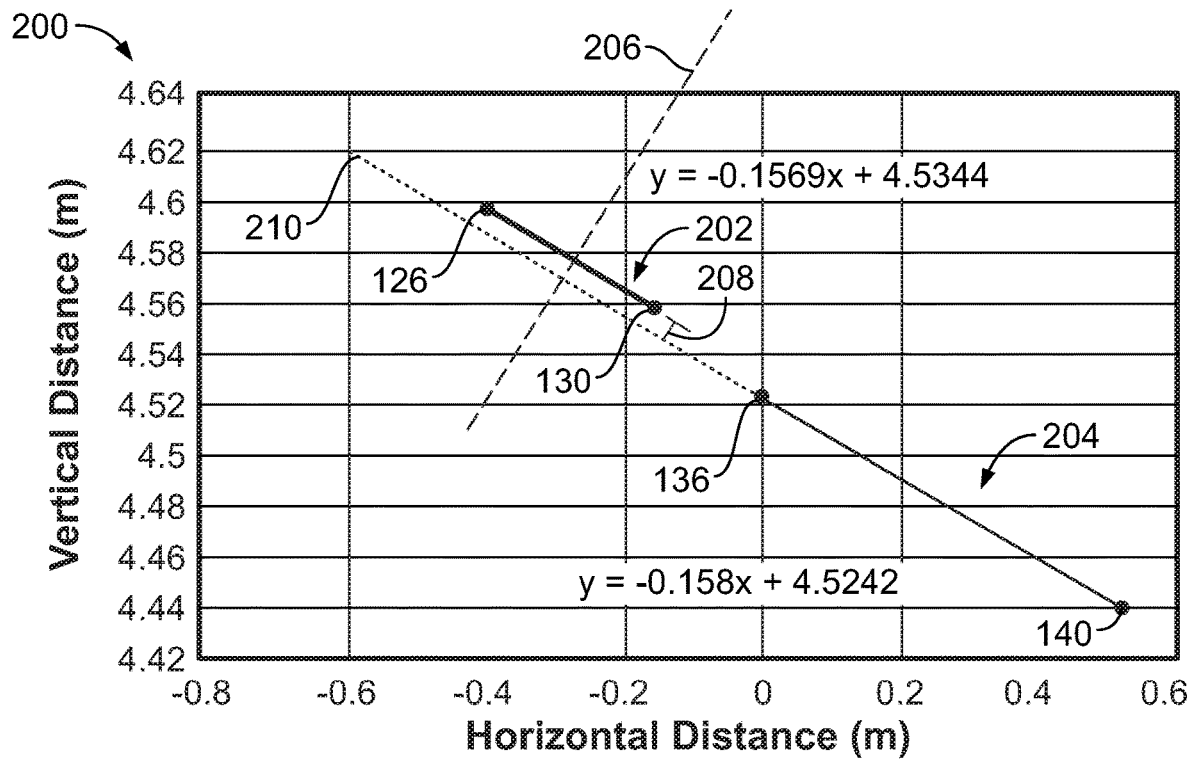
FIG. 4A illustrates a graph including (i) an example first plot line graphic and an example second plot line graphic, according to an example implementation.

The processor 110 is configured to receive these signals indicative of the distance measured by each laser rangefinder. Further, the processor 110 is configured to generate a first plot line graphic of the measured distances of each of the laser rangefinders of the first set to its respective target location and a second plot line graphic of the measured distances of each of the laser rangefinders of the second set to its respective target location. For instance, FIG. 4A illustrates an example graph 200 illustrating an example first plot line graphic 202 and an example second plot line graphic 204. The first plot line graphic 202 illustrates the measured distances to target locations 126, 130, and the second plot line graphic 204 illustrates the measured distances to target locations 136, 140.

Based on these generated plot line graphics 202, 204, it is possible to determine whether the control surface 138 is positioned such that the fixed surface 128 and the control surface 138 are properly aligned. In particular, the processor 110 may determine whether the first and second plot line graphics are aligned, which in turn indicates that the fixed surface 128 and the control surface 138 are aligned with one another such that the control surface is in the known reference position.

The processor 110 can determine whether the first and second plot line graphics 202, 204 are aligned in any suitable fashion. Within examples, determining whether the first and second plot line graphics 202, 204 are aligned involves determining (i) whether the slopes of first plot line graphic 202 and the second plot line graphic are within a predefined tolerance and (ii) whether a distance between the first plot line graphic 202 and a line extending through the second plot line graphic 204 is within a predefined tolerance. For instance, in the example of FIG. 4A, the processor 110 generates a perpendicular bisector 206 of the first plot line graphic 202 (i.e., a line perpendicular to the first plot line graphic 202) to determine a distance 208 between (i) the first plot line graphic 202 and (ii) a line 210 extending through the second plot line graphic 204. Further, the processor 110 calculates a slope of the first plot line graphic 202 and a slope of the second plot line graphic 204. The processor 110 may then determine whether the distance 208 is within a predefined tolerance and whether the calculated slopes are within a predefined tolerance. This perpendicular-bisector and slope analysis thus allows the optical system 102 to determine whether the target locations 126, 130 on the fixed surface 128 and the target locations 136, 140 on the control surface are aligned within a predefined tolerance.

These predefined tolerances can be any suitable tolerance, and the tolerances can be determined based on various factors, such as the manufacturing specifications of the aircraft, the production requirements of the aircraft, and/or the type of control surface being rigged. Within examples, the predefined tolerance for the slope is a value between about 0.00001-0.001% (e.g., about 0.00001, about 0.00005, about 0.0001, about 0.0005, or about 0.001%), and the predefined tolerance for the distance between the first plot line graphic 202 and line 210 extending through the second plot line graphic 204 is between about $1/10,000^{th}$-$1/64,000^{th}$ of an inch (e.g., about $1/10,000^{th}$, about $1/15,000$, about $1/32,000$, about $1/45,000^{th}$, or about $1/64,000^{th}$ of an inch).

Figure 4B:
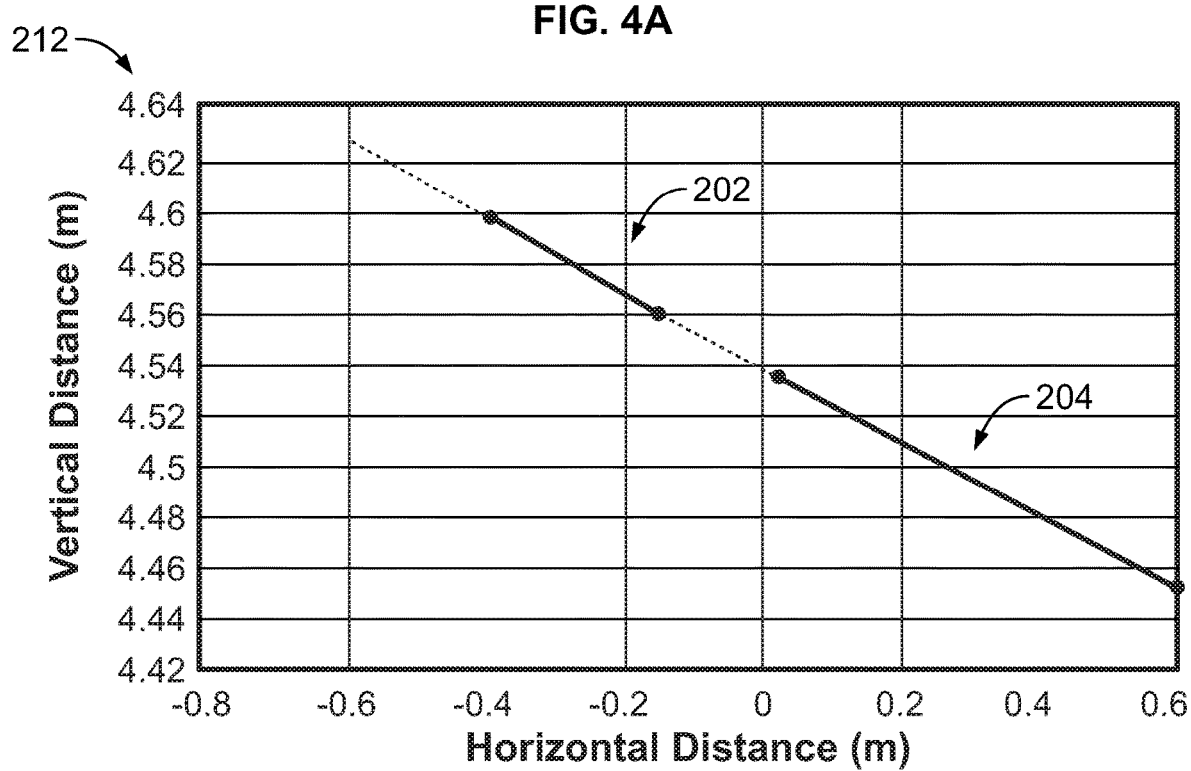
FIG. 4B illustrates a graph including (i) an example first plot line graphic and an example second plot line graphic, according to an example implementation.

In practice, if the determination is that the first and second plot line graphics 202, 204 are not aligned with one another, the position of the control surface 138 can be adjusted, and then the optical system 102 can once again perform measurements to determine whether the fixed surface 128 and the adjusted control surface 138 are aligned. Additionally, this process can be repeated until the first plot line graphic 202 and the second plot line graphic 204 are aligned with one another within a predefined tolerance. For instance, FIG. 4B illustrates a graph 212 of measurements after the control surface 138 has been adjusted and the optical system 102 has performed additional distance measurements. In this example of FIG. 4B, the first plot line graphic 202 and the second plot line graphic 204 are now aligned with one another, thereby indicating that the fixed surface 128 and control surface 138 are properly aligned. In FIG. 4B, the slopes of the first plot line graphic 202 and the second plot line graphic 204 are equal (or substantially equal), and each is plotted along the same function (y=ax+c), for example.

Within examples, the optical system 102 is configured to simultaneously trigger each of the laser rangefinders of the first and second sets 106, 108 to take a measurement of its distance to its respective target location. For instance, within examples, the processor 110 sends signals to each of the laser rangefinders of the first and second sets 106, 108, so as to simultaneously trigger each of the laser rangefinders of the first and second sets to take a measurement of its distance to its respective target location. In practice, the fixed surface 128 (e.g., the wing) may be subject to jitter (e.g., vibrations or other movement) during the rigging process. By simultaneously triggering each of the laser rangefinders, the laser rangefinders will determine the distance to their target locations at the same or substantially the same time.

As used herein, simultaneously triggering each of the laser rangefinders of the first and second sets 106, 108 to take a measurement of its distance to its respective target location means that each of the laser rangefinders is triggered at the same or substantially the same time. Within examples, simultaneously triggering the laser rangefinders means that the laser rangefinders are triggered within about 100 microseconds of one another. Time coherent measurements help to eliminate error introduced by movement of the aircraft, wings, or support structure of the control surface.

Figure 5A:
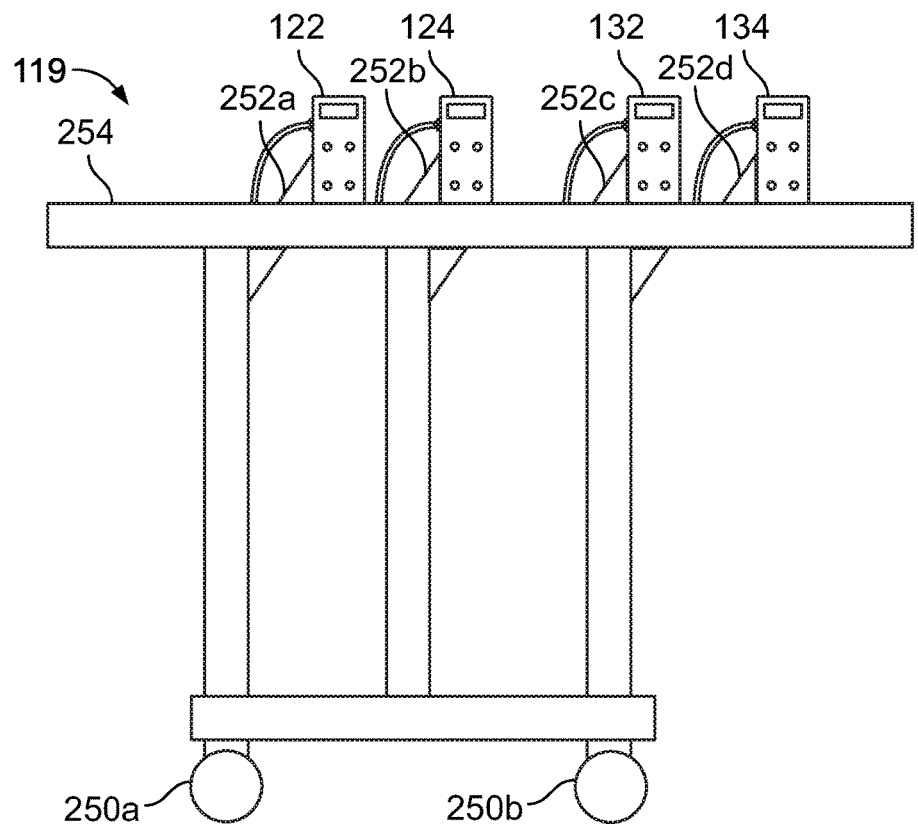
FIG. 5A illustrates an example mounting station of the system of FIG. 1, according to an example implementation.
Figure 5B:
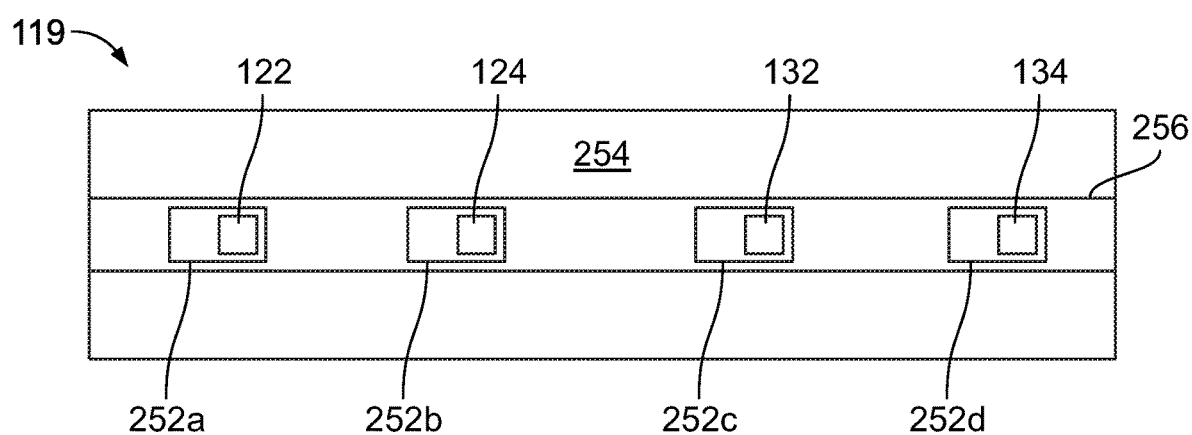
FIG. 5B illustrates a top view of the mounting station of FIG. 5A, according to an example implementation.

As mentioned above with reference to FIG. 1, the optical system 102 includes a mounting station 119 to mount each laser rangefinder of the first and second sets thereto. FIGS. 5A-5B illustrate the example mounting station 119 in further detail. As seen in FIG. 5A, laser rangefinders 122, 124, 132, and 134 are each mounted on the mounting station 119. The mounting station 119 includes wheels 250*a*-250*b*. In practice, the mounting station 119 may be moved around the aircraft 104 (e.g., wheeled around the ground 260 (see FIG. 2)) to different positions, thereby allowing the optical system 102 to be positioned to rig any desired control surface on the aircraft 104.

Within examples, the mounting station 119 includes, for each laser rangefinder of the first and second sets, a mounting device attached to the laser rangefinder that is configured to position the laser rangefinder to point its laser beam to its respective target location. Further, within examples, the mounting station 119 includes an adjustable body that allows for adjusting distances between each of the laser rangefinders of the first and second sets 106, 108. For instance, as shown in FIGS. 5A-5B, mounting station 119 includes mounting devices 252*a*-252*d* and adjustable body 254. The position and/or angle of these mounting devices 252*a*-252*d* can be adjusted, so as to allow each laser rangefinder to point its laser beam 184*a*-184*b* (see FIG. 3) to its respective target location. Further, in this illustrated example, the adjustable body 254 includes a track 256 (see FIG. 5B). Mounting devices 252*a*-252*d* are moveable along the track 256 to adjust the distances between adjacent mounting devices. Further, the mounting device 252*a*-252*d* may include a component to allow for rotation of the mounting device 252*a*-252*d* or the laser rangefinders 122, 124, 132, 134, such as a swivel or a rotary actuator.

Although FIG. 5B illustrates an adjustable body 254 that includes a single track 256, other example adjustable bodies are possible as well. For instance, within other examples, each mounting device 252*a*-252*d* may include its own track through which the attached laser rangefinder is moveable. Further, within examples, the position and/or angle of the mounting devices 252*a*-252*d* can be manually adjusted to position the laser rangefinder to point a laser beam to its respective target location. Within other examples, the mounting devices may be attached to motorized controls controlled by processor 110, and thus the adjustment of the mounting devices to position the laser rangefinder to point a laser beam to its respective target location may thus be motorized.

Beneficially, given the maneuverability of the optical system 102 and the adjustability of the mounting devices 252*a*-252*d*, the optical system 102 can be used to rig any of the plurality of control surfaces on the aircraft 104. In general, the optical system 102 can be used to rig any control surface, so long as the optical system 102 is positioned to have a clear line of sight to the target locations of the fixed surface and the control surface, such that the laser beams 184*a*-184*d* (see FIG. 3) can reach their respective target locations.

Although in this example the first set 106 and second set 108 each include two laser rangefinders, in other examples, the first set 106 and second 108 include more than two laser rangefinders. For instance, within other examples, the first set 106 and/or the second set 108 include 3, 4, 5, 6, 7, 8, 9, or more laser rangefinders. Further, any suitable optical rangefinders can be used within optical system 102. In a particular example, the laser rangefinders are Acuity® AR2000 laser distance meters, which are configured to measure distances up to about 500 meters away and to have a measurement frequency of up to about 100 hertz (Hz). However, other rangefinders, measurement distances, and measurement frequencies are possible as well.

Figure 6:
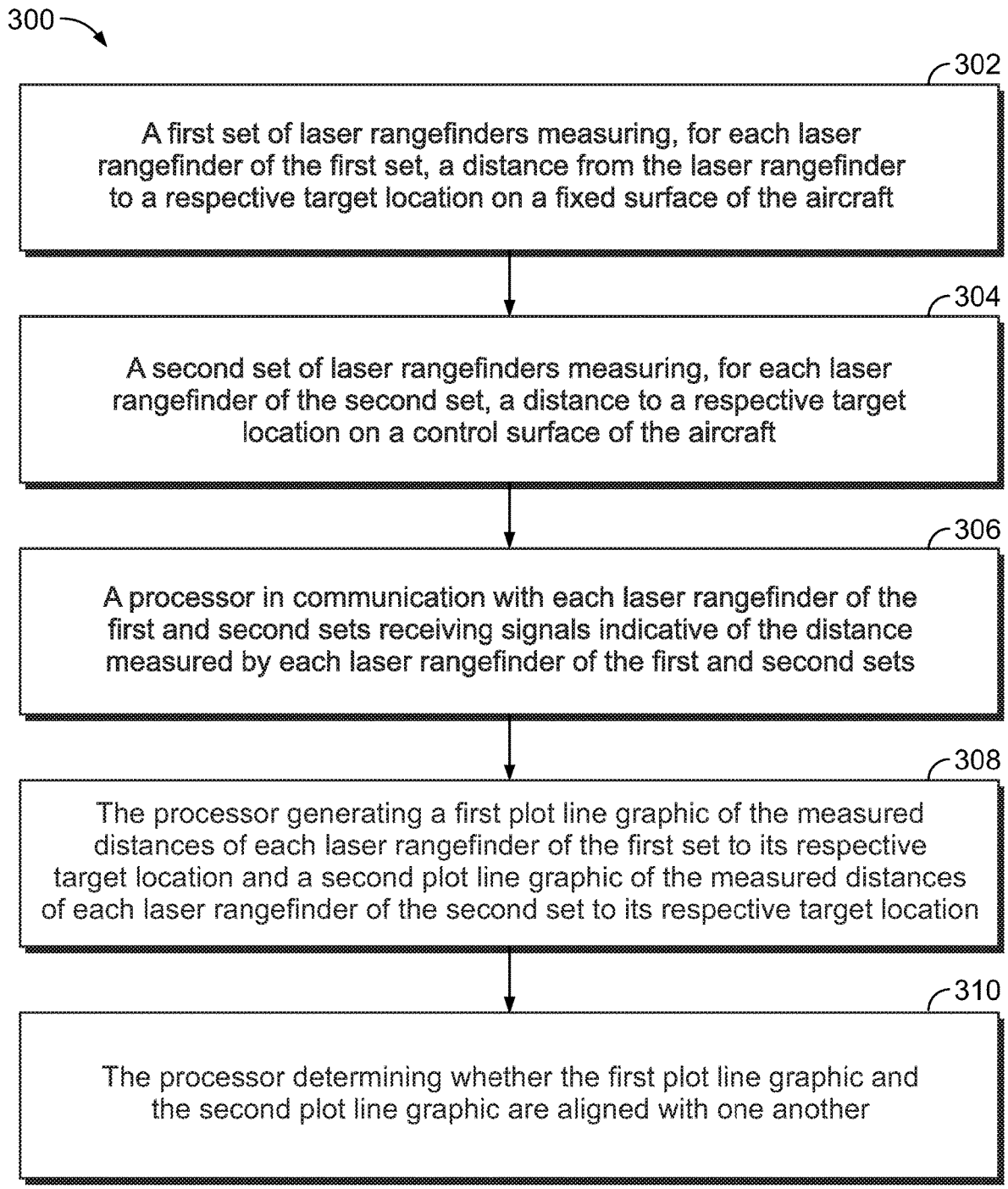
FIG. 6 shows a flowchart of an example method of aircraft flight control rigging, according to an example implementation.

FIG. 6 shows a flowchart of an example method 300 of rigging the flight control of an aircraft, according to an example implementation. Method 300 shown in FIG. 6 presents an embodiment of a method that could be used with the system 100 shown in FIG. 1 and/or the optical system 102 shown in FIG. 1, for example. Further, devices or systems may be used or configured to perform logical functions presented in FIG. 6. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 300 may include one or more operations, functions, or actions as illustrated by one or more of blocks 302-310. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include a non-transitory computer readable medium or memory, for example, such as computer-readable medium that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 6, and within other processes and methods disclosed herein, may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 302, the method 300 includes a first set 106 of laser rangefinders measuring, for each laser rangefinder 122, 124 of the first set 106, a distance from the laser rangefinder 122, 124 to a respective target location 126, 130 on a fixed surface 128 of the aircraft 104.

At block 304, the method 300 includes a second set 108 of laser rangefinders measuring, for each laser rangefinder 132, 134 of the second set 108, a distance to a respective target location 136, 140 on a control surface 138 of the aircraft 104.

At block 306, the method 300 includes a processor 110 in communication with each laser rangefinder of the first and second sets 106, 108 receiving signals indicative of the distance measured by each laser rangefinder of the first and second sets 106, 108.

At block 308, the method 300 includes the processor 110 generating a first plot line graphic 202 of the measured distances of each laser rangefinder 122, 124 of the first set 106 to its respective target location 126, 130 and a second plot line graphic 204 of the measured distances of each laser rangefinder 132, 134 of the second set 108 to its respective target location 136, 140.

At block 310, the method 300 includes the processor 110 determining whether the first plot line graphic 202 and the second plot line graphic 204 are aligned with one another.

In an example, determining whether the first plot line graphic 202 and the second plot line graphic 204 are aligned with one another comprises (i) generating a perpendicular bisector 206 of the first plot line graphic 202 and (ii) determining a distance 208 between the first plot line graphic 202 and a line 210 extending through the second plot line graphic 204, so as to determine whether the target locations 126, 130 on the fixed surface 128 and the target locations 136, 140 on the control surface 138 are aligned within a predefined tolerance.

In an example, determining whether the first plot line graphic 202 and the second plot line graphic 204 are aligned with one another comprises (i) calculating a slope of the first plot line graphic 202 and a slope of the second plot line graphic 204 and (ii) determining whether the calculated slopes are within a threshold amount of one another, so as to determine whether the target locations 126, 130 on the fixed surface 128 and the target locations 13, 140 on the control surface 138 are aligned within a predefined tolerance.

FIG. 7 shows a flowchart of an example method for use with the method 300, according to an example implementation. At block 312, functions include simultaneously triggering each laser rangefinder 122, 124, 132, 134 of the first and second sets 106, 108 to take a measurement of its distance to its respective target location 126, 130, 136, 140.

FIG. 8 shows a flowchart of another example method for use with the method 300, according to an example implementation. At block 314, functions include, if the determination is that the first and second plot line graphics 202, 204 are not aligned with one another, adjusting a position of the control surface 138.

FIG. 9 shows a flowchart of another example method for use with the method 300, according to an example implementation. At block 316, functions include iteratively performing the functions of blocks 302-314 until the first plot line graphic 202 and the second plot line graphic 204 are aligned with one another.

FIG. 10 shows a flowchart of another example method for use with the method 300, according to an example implementation. At block 318, functions include positioning each laser rangefinder 122, 124, 132, 134 of the first and second sets 106, 108 to point its laser beam 184a-184d to its respective target location 126, 130, 136, 140.

Example systems and methods described herein provide improved systems and methods for aircraft flight control rigging. The disclosed systems and methods do not involve use of mechanical jigs and thus eliminate reliance on a visual determination that the moving control surface and fixed surface are aligned. Further, as mentioned above, the optical system 102 can be positioned on the ground 260 (e.g., the production floor) during the rigging process. Since the optical system 102 can be positioned on the ground, rigging personnel can remain on the production floor throughout the rigging process (versus being lifted up via a machine lift in order to be positioned close to the moving control surface). By allowing the rigging personnel to remain on the ground during the rigging process, the disclosed systems and methods help to prevent the rigging personnel from being exposed to potentially hazardous falls and/or potentially hazardous moving surfaces.

The disclosed systems and methods also help to reduce or eliminate the effect of jitter of the fixed surface. As mentioned above, during the rigging process, the fixed surface (e.g., the wing) may be subject to jitter (e.g., vibrations or other movement). Beneficially, each laser rangefinders of the first and second sets can be triggered simultaneously to determine the distance to their target locations at the same or substantially the same time. This simultaneous triggering allows the disclosed systems and methods for aircraft flight control rigging to reduce or eliminate the effect of jitter, thereby improving the accuracy of the aircraft flight control rigging.

Additionally, although the disclosed methods and systems are described primarily with reference to rigging the flight control surfaces of an aircraft, it should be understood that the disclosed systems and methods may be used for rigging control surfaces of other systems as well. Within examples, the disclosed systems and methods may be used for rigging control surfaces of many different types of vehicles or systems, including an aerial vehicle including a winged aerial vehicle, an un-manned aerial vehicle (UAV), a drone, a rotorcraft device, a multicopter, an autonomously driven vehicle, a land vehicle, a water vehicle, a water submersible vehicle, and/or manufacturing systems/equipment, among other possibilities.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

As used herein, the term "about" in association with a numerical value means that the value varies up or down by 5%. For example, a value of "about 100" means 95 to 105 (or any value between 95 and 105).

Different examples of the system(s) and method(s) disclosed herein include a variety of components, features, and functionalities. It should be understood that the various examples of the system(s) and method(s) disclosed herein may include any of the components, features, and functionalities of any of the other examples of the system(s) and method(s) disclosed herein in any combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

It is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims.

What is claimed is:

1. An optical system for aircraft flight control rigging, comprising:
    a first set of laser rangefinders to measure, for each laser rangefinder of the first set, a distance from the laser rangefinder to a respective target location on a fixed surface of an aircraft;
    a second set of laser rangefinders to measure, for each laser rangefinder of the second set, a distance to a respective target location on a control surface of the aircraft; and
    a processor in communication with each laser rangefinder of the first and second sets to (i) receive signals indicative of the distance measured by each laser rangefinder (ii) generate a first plot line graphic of the measured distances of each of the laser rangefinders of the first set to its respective target location and a second plot line graphic of the measured distances of each of the laser rangefinders of the second set to its respective target location, and (iii) determine whether the first plot line graphic and the second plot line graphic are aligned with one another.

2. The optical system of claim 1, wherein the processor simultaneously triggers each of the laser rangefinders of the first and second sets to take a measurement of its distance to its respective target location.

3. The optical system of claim 1, further comprising:
    a mounting station to mount each laser rangefinder of the first and second sets thereto.

4. The optical system of claim 3, further comprising:
    for each laser rangefinder of the first and second sets, a mounting device attached to the laser rangefinder, wherein the mounting device is configured to position the laser rangefinder to point a laser beam to its respective target location.

5. The optical system of claim 3, wherein the mounting station comprises an adjustable body that allows for adjusting distances between each of the laser rangefinders of the first and second sets.

6. The optical system of claim 1, wherein the control surface is selected from the group consisting of a flap, a rudder, a slat, an elevator, an anti-balance tab, a balance tab, an aileron, a flaperon, and a spoileron.

7. The optical system of claim 1, wherein the fixed surface comprises a stationary surface on a wing or stabilizer of the aircraft.

8. The optical system of claim 1, wherein the target locations on the fixed surface of the aircraft and the target locations on the control surface of the aircraft are predefined target locations based on manufacturing specifications of the aircraft.

9. The optical system of claim 8, wherein the predefined target locations based on manufacturing specifications of the aircraft are selected such that the target locations are arranged in a path through which a straight line is drawn when the control surface is arranged in a known reference position.

10. The optical system of claim 1, wherein the processor generates a perpendicular bisector of the first plot line graphic to determine a distance between the first plot line graphic and a line extending through the second plot line graphic, so as to determine whether the target locations on the fixed surface and the target locations on the control surface are aligned within a predefined tolerance.

11. The optical system of claim 1, wherein the processor calculates a slope of the first plot line graphic and a slope of the second plot line graphic and determines whether the calculated slopes are within a threshold amount of one another, so as to determine whether the target locations on the fixed surface and the target locations on the control surface are aligned within a predefined tolerance.

12. An optical system for aircraft flight control rigging, comprising:
a first set of laser rangefinders to measure, for each laser rangefinder of the first set, a distance from the laser rangefinder to a respective target location on a fixed surface of an aircraft;
a second set of laser rangefinders to measure, for each laser rangefinder of the second set, a distance to a respective target location on a control surface of the aircraft;
a mounting station to mount each laser rangefinder of the first and second sets thereto; and
a processor in communication with each laser rangefinder of the first and second sets to (i) simultaneously trigger each of the laser rangefinders of the first and second sets to take a measurement of its distance to its respective target location, (ii) receive signals indicative of the distance measured by each laser rangefinder, (iii) generate a first plot line graphic of the measured distances of each of the laser rangefinders of the first set to its respective target location and a second plot line graphic of the measured distances of each of the laser rangefinders of the second set to its respective target location, and (iv) determine whether the first plot line graphic and the second plot line graphic are aligned with one another.

13. The optical system of claim 12, wherein the mounting station comprises an adjustable body that allows for adjusting distances between each of the laser rangefinders of the first and second sets.

14. A method for rigging the flight control of an aircraft, comprising:
a first set of laser rangefinders measuring, for each laser rangefinder of the first set, a distance from the laser rangefinder to a respective target location on a fixed surface of the aircraft;
a second set of laser rangefinders measuring, for each laser rangefinder of the second set, a distance to a respective target location on a control surface of the aircraft;
a processor in communication with each laser rangefinder of the first and second sets receiving signals indicative of the distance measured by each laser rangefinder of the first and second sets;
the processor generating a first plot line graphic of the measured distances of each laser rangefinder of the first set to its respective target location and a second plot line graphic of the measured distances of each laser rangefinder of the second set to its respective target location; and
the processor determining whether the first plot line graphic and the second plot line graphic are aligned with one another.

15. The method of claim 14, further comprising simultaneously triggering each laser rangefinder of the first and second sets to take a measurement of its distance to its respective target location.

16. The method of claim 14, further comprising:
if the determination is that the first and second plot line graphics are not aligned with one another, determining that adjustments to a position of the control surface are needed; and
adjusting the position of the control surface.

17. The method of claim 16, further comprising:
iteratively performing the steps of the method of claim 16 until the first plot line graphic and the second plot line graphic are aligned with one another.

18. The method of claim 14, further comprising:
positioning each laser rangefinder of the first and second sets to point its laser beam to its respective target location.

19. The method of claim 14, wherein determining whether the first plot line graphic and the second plot line graphic are aligned with one another comprises:
calculating a slope of the first plot line graphic and a slope of the second plot line graphic;
generating a perpendicular bisector of the first plot line graphic; and
determining a distance between the first plot line graphic and a line extending through the second plot line graphic using the perpendicular bisector and the slope, so as to determine whether the target locations on the fixed surface and the target locations on the control surface are aligned within a predefined tolerance.

20. The method of claim 14, wherein determining whether the first plot line graphic and the second plot line graphic are aligned with one another comprises:
calculating a slope of the first plot line graphic and a slope of the second plot line graphic; and
determining whether the calculated slopes are within a threshold amount of one another to determine whether the target locations on the fixed surface and the target locations on the control surface are aligned within a predefined tolerance.

* * * * *